United States Patent [19]
Hansen

[11] Patent Number: 5,220,818
[45] Date of Patent: Jun. 22, 1993

[54] APPARATUS FOR BENDING PIPES WITH HINGED CLAMPING JAWS

[75] Inventor: Jörg Hansen, Wettringen, Fed. Rep. of Germany

[73] Assignee: Hewing GmbH, Ochtrup, Fed. Rep. of Germany

[21] Appl. No.: 834,036

[22] Filed: Feb. 11, 1992

[30] Foreign Application Priority Data

Mar. 19, 1991 [DE] Fed. Rep. of Germany ... 9103368[U]

[51] Int. Cl.⁵ .............................................. B21D 7/02
[52] U.S. Cl. ......................................... 72/217; 72/459
[58] Field of Search ................. 72/217, 218, 219, 214, 72/215, 216, 387, 459, 458

[56] References Cited

U.S. PATENT DOCUMENTS

| | | |
|---|---|---|
| 1,272,552 | 7/1918 | Spencer ................................... 72/217 |
| 2,345,102 | 3/1944 | Dick ........................................ 72/217 |
| 3,051,218 | 8/1962 | Franck ..................................... 72/387 |
| 3,059,683 | 10/1962 | Atherton ................................. 72/459 |
| 3,194,038 | 7/1965 | Small et al. ............................. 72/459 |
| 3,458,440 | 5/1976 | Sassak ..................................... 72/218 |
| 4,132,100 | 1/1979 | Schuler ................................... 72/217 |
| 4,355,528 | 10/1982 | Rothenberger ........................ 72/459 |

FOREIGN PATENT DOCUMENTS

| | | | |
|---|---|---|---|
| 2835405 | 2/1980 | Fed. Rep. of Germany ........ 72/217 |
| 0688257 | 9/1979 | U.S.S.R. ................................. 72/459 |
| 0845407 | 5/1962 | United Kingdom ................... 72/459 |

Primary Examiner—Lowell A. Larson
Assistant Examiner—Michael J. McKeon
Attorney, Agent, or Firm—Jordan & Hamburg

[57] ABSTRACT

Apparatus for bending pipes, particularly plastic or composite pipes, includes a chucking fixture for anchoring the pipes near the bending region, a bending template, the profile of which is made to fit the pipe cross section, and a bending cylinder which, in turn, has a profile that is made to fit the pipe cross section and is supported by a provided lever which, during a pivoting motion of the bending cylinder, is moved on a graduated circle about the bending template and runs concentrically to the surface of the bending template. In order to achieve easy manipulation, the apparatus is constructed as a manually operated device and parts of the apparatus are disposed on a mounting plate which is provided with a hand lever as a back-stop and which has a pivoted lever in the form of a hand lever for the bending cylinder.

13 Claims, 5 Drawing Sheets ically. The clamping jaws 9, 10, as shown in the side view and plan view of FIGS. 6 to 9, have, on the side averted from the pipe 3, spherical surface sections 31, which interact with corresponding surfaces on a clamping cap.

APPARATUS FOR BENDING PIPES WITH HINGED CLAMPING JAWS

The invention relates to an apparatus for bending pipes, particularly plastic or composite pipes.

BACKGROUND OF THE INVENTION

Starting out from stationary apparatuses of the initially mentioned type, it is an object of the invention to provide an apparatus for bending pipes, which can be used universally for plastic and composite pipes as an easily handled bending tool and can be adapted at little cost to different requirements.

SUMMARY OF THE INVENTION

The invention provides an apparatus for bending pipes, preferably plastic or composite pipes, the parts of which apparatus are held in a particularly simple construction on a freely portable mounting plate. Moreover, the apparatus is to be adaptable with a few manipulations to different pipe profiles and, despite its handiness, is to make it possible to realize bending radii of 1.25 to 3.5×D without buckling. To fix the position of the pipe particularly securely during the bending process, clamping jaws of a chucking device are provided, which can be applied firmly over a closing curve against pipes of the respective diameter and bring about a two-dimensional clamping before the bending region, so that the concentric motion of the pivoting lever of the bending cylinder, which is constructed as a hand lever, makes it possible to initiate a metered-out force on the pipe. By varying the lever length, the converting or reshaping force can be made to fit different pipes. With regard to further significant advantages and details of the invention, reference is made to the following specification and drawing, in which an embodiment of the object of the invention is shown diagrammatically in greater detail. The following is shown in the accompanying drawings:

DESCRIPTION OF THE PREFERRED EMBODIMENTS

Figure 1:
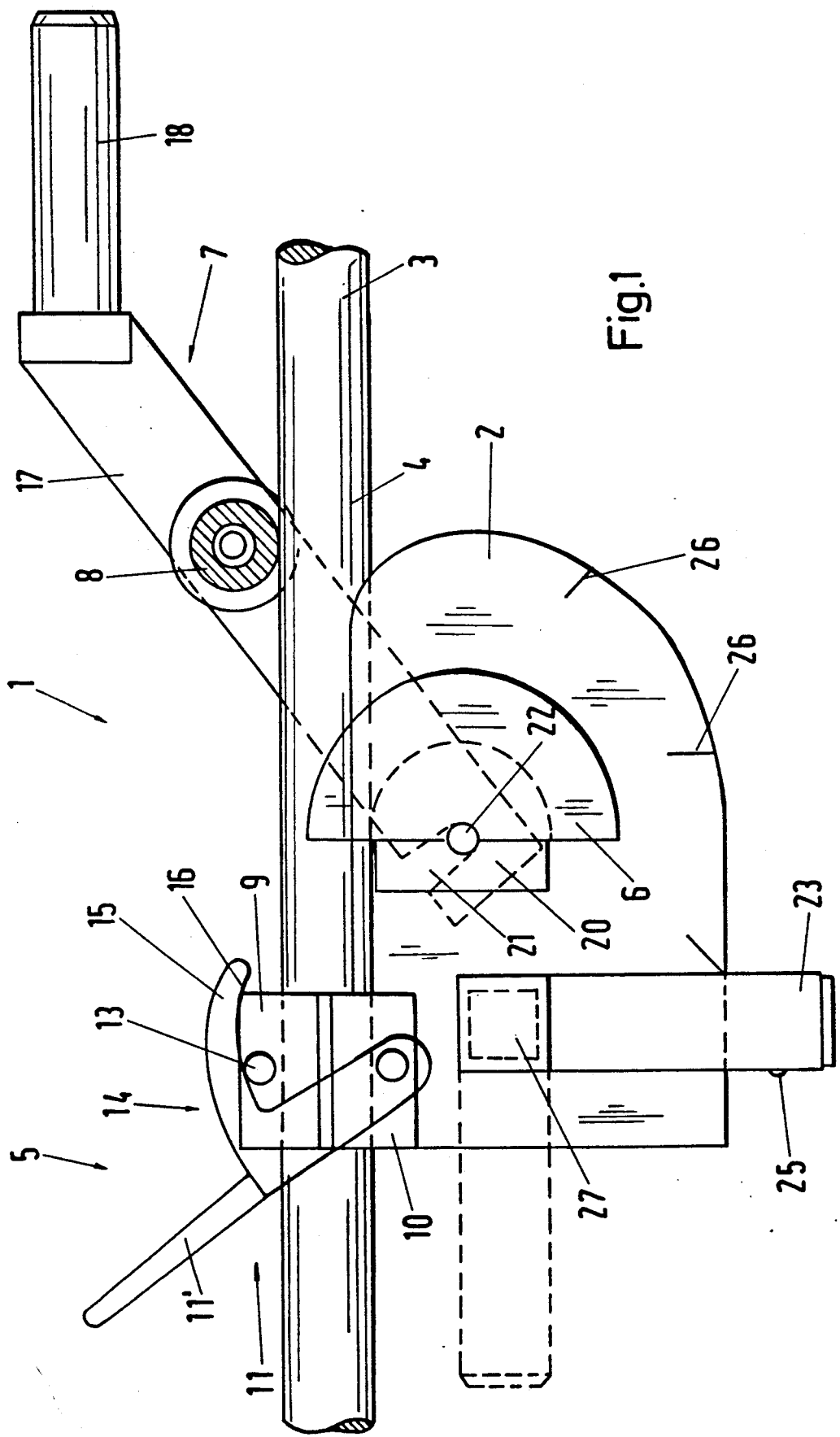
FIG. 1 shows a schematic representation of an inventive apparatus with a pipe that is to be bent, in the initial position of the parts.

In FIG. 1, an apparatus, for bending pipes, which as a whole is labeled 1, is shown in a construction as a manually operated device, which has a mounting plate 2, to which a chucking fixture 5 for securing a pipe 3 near the clamping region 4 is detachably fastened. The pipe 3 is advanced so far into the region of the bending template 6, which is also detachably fastened to the mounting plate 2, that a bending cylinder 8, which is held exchangeably at a pivoted lever 7, lies on the pipe 3.

In this initial bending position of FIG. 1, the pipe 3 is taken up in the chucking fixture 5 by clamping jaws 9, 10 (FIGS. 5 to 9) and fixed in position with a clamping clip 11 so that it will not shift, the clamping jaws 9 and 10 providing a two-dimensional contact.

Figure 5:
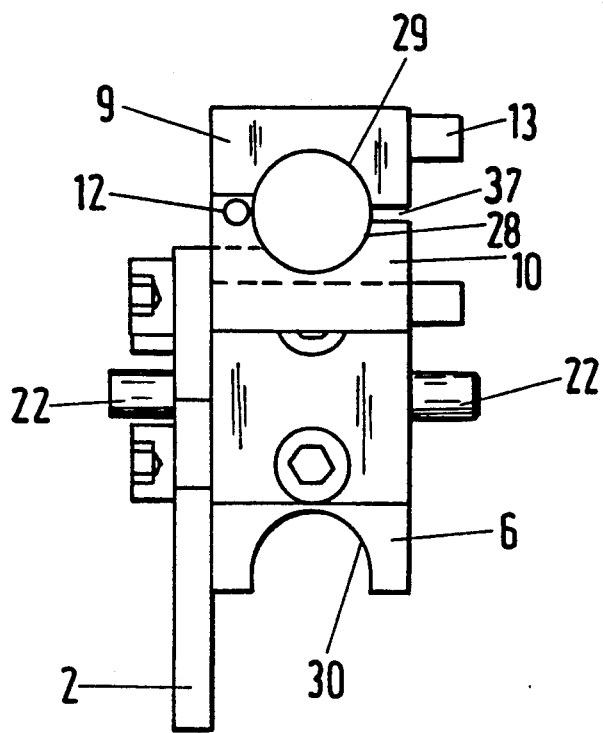
FIG. 5 shows a schematic representation of FIG. 1 in side view without hand lever and without clamping clip.

The chucking fixture 5 advisably has an upper, pivotably movable clamping jaw 9 and a lower stationary clamping jaw 10, which are exchangeable for adaptation to different diameters of the pipe 3. The pivotably movable connection of the clamping jaws 9, 10 is advisably established over a hinge 12 (FIG. 5).

On its side averted from the hinge 12 (FIG. 5), the chucking fixture 5 has a pin-shaped clamping dog 13, onto which it is possible to slide a clamping element 14 of the clamping clip 11. The clamping element 14 is formed by an arc-shaped projection 15, which is connected in one piece with a part of the clamping lever 11' forming the clamping clip 11. As the pivoting angle of the upper clamping jaw 9 increases, the clamping lever 11' imparts an increasing clamping force, since the projection 15 is constructed with a closing curve 16 in the region of contact with the clamping dog 13.

The bending cylinder 8, which is in the starting position in FIG. 1, is supported at a pivoted lever 7, which is constructed as a bending fork 17 so that it can rotate and advisably be exchanged. A lever extension 19 (FIG. 4) can be slipped onto the pivoting lever 7 in the region of a 90° offset projection 18.

In the end region of its legs 20, the bending fork 17 has accommodating slots 21 with which the bending fork 17 can be placed on swivel pins 22, which are attached to the mounting plate 2 and which support the bending fork 17 pivotably in the form of an abutment.

A lever part 23, the alignment of which with respect to the mounting plate 2 is adjustable and on which likewise a slip-on, exchangeable lever extension 24 is held with a locking knob 25, is disposed on the mounting plate 2 as backstop.

In an advantageous design, the bending template 6 is constructed as an exchangeable part of the apparatus, so that plastic or composite pipes 3 with different external diameters can be bent with the apparatus 1. The bending radius of the bending template 6 can be 1.25 to 3.5 times the diameter of the pipe.

Figure 2:
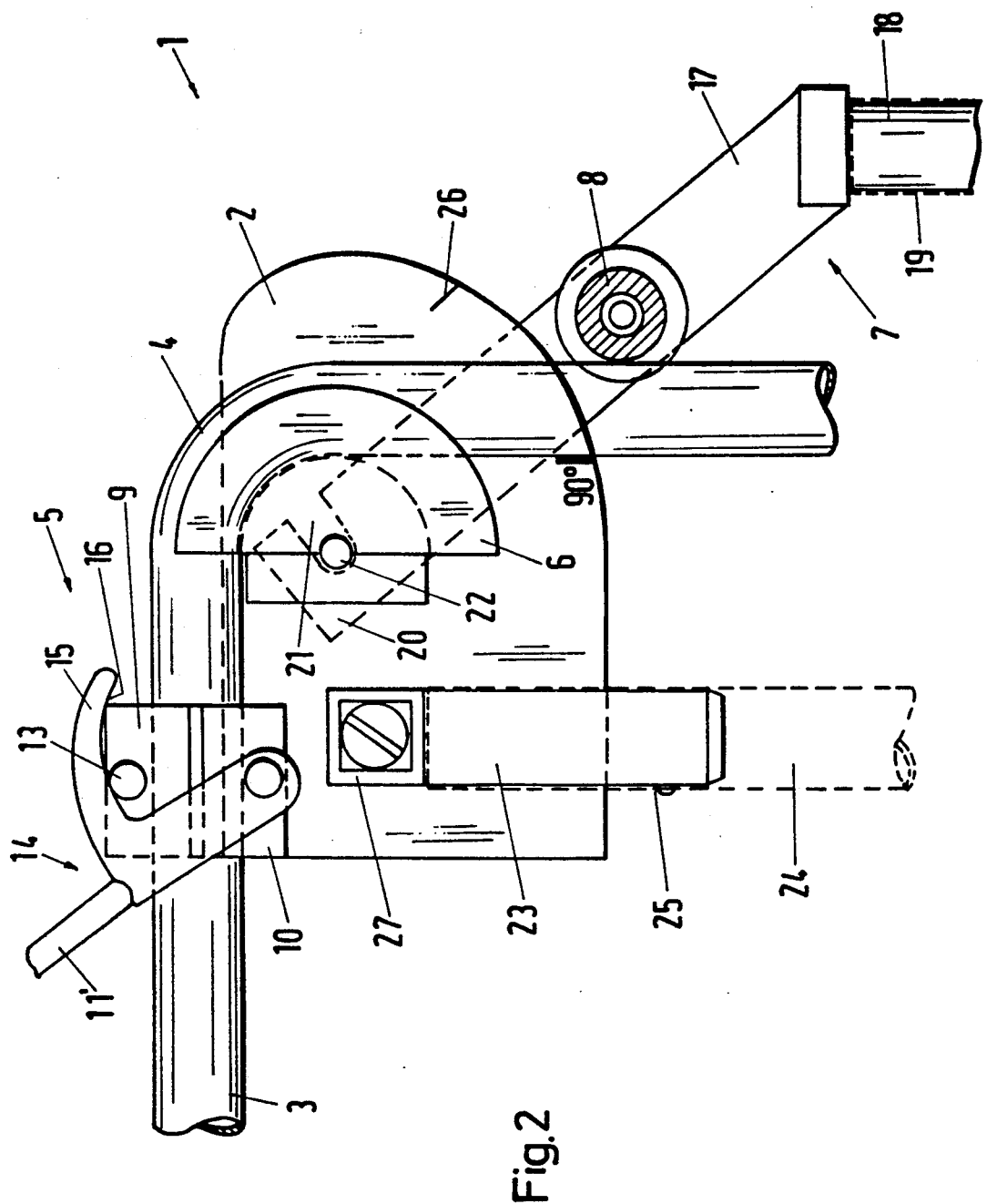
FIG. 2 shows the parts of the apparatus of FIG. 1, together with the pipe at a bending angle of 90°.
Figure 3:
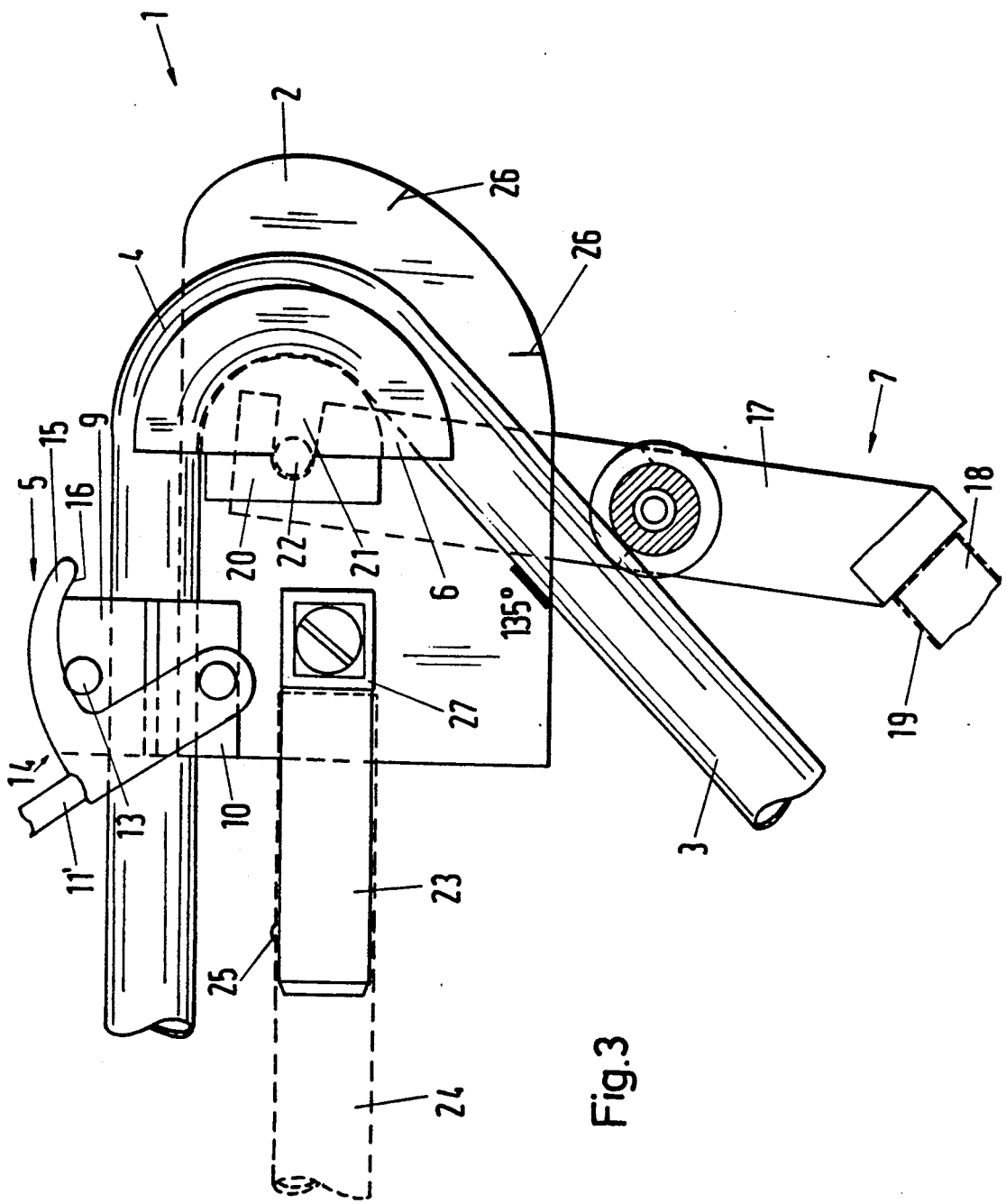
FIG. 3 shows the parts of the apparatus of FIG. 1, together with the pipe at a bending angle of 135°.
Figure 4:
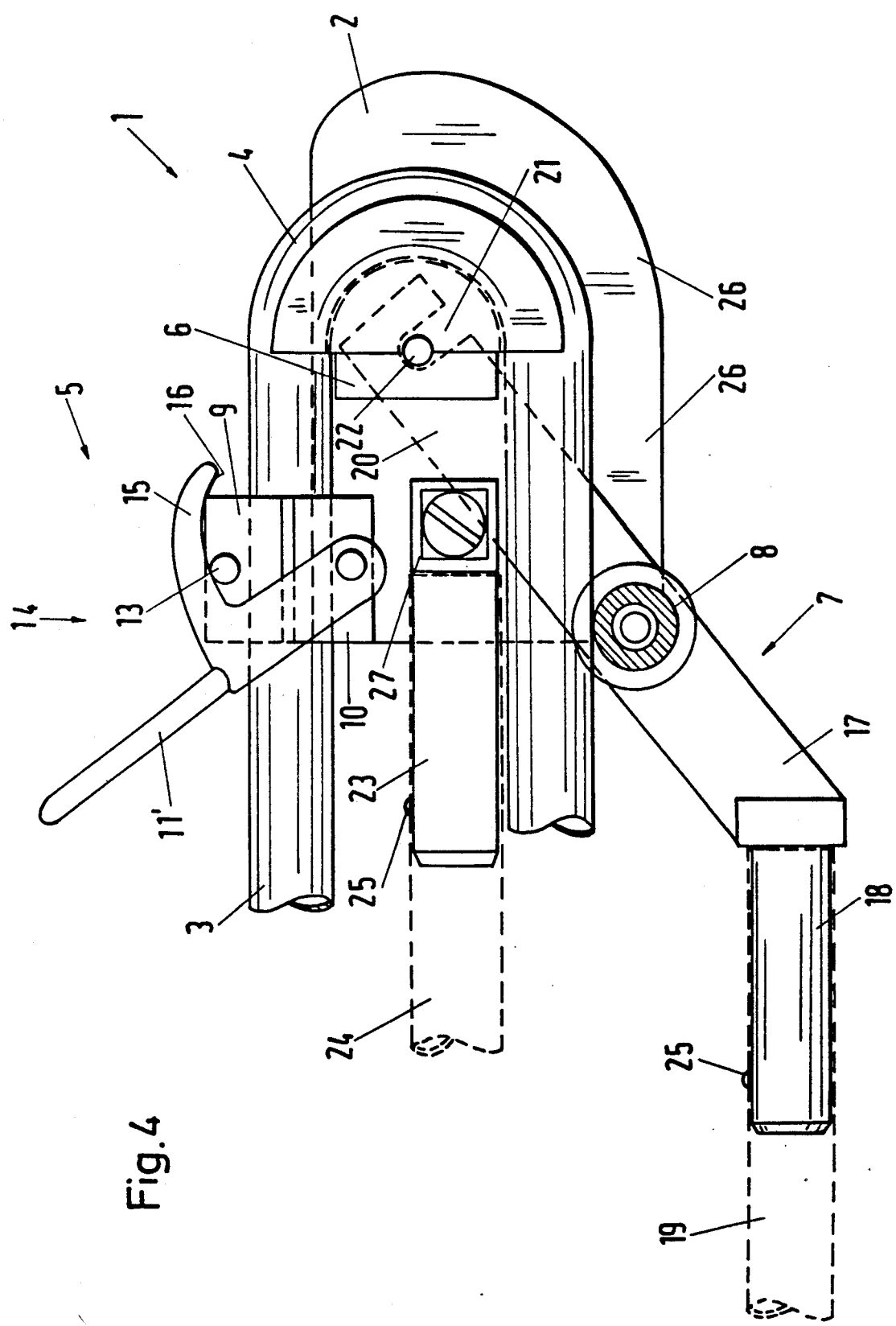
FIG. 4 shows the parts of the apparatus of FIG. 1, together with the pipe at a bending angle of 180°.

Different bending stages of the pipe 3 are shown in FIGS. 2 to 4. With its bending cylinder 8, the pivoted lever 7 has pivoted the pipe 3 so far around the bending template 6, that the intended bending angle is attained. The bending angle attained can be read at an appropriate marking 26 on the mounting plate 2. For this manual bending process, the hand lever 23, 24, with its holding region 27, is in each case shifted into the position appropriate for a backstop.

In the side view of FIG. 5, it becomes clear that appropriate profiled recesses 28, 29 are provided in the clamping jaws 9, 10 for anchoring the undeformed pipe 3. In the embodiment shown, the radius of the profiled recesses 28, 29 corresponds to the semicircular profile 30 in the bending template 6, so that the region of the pipe 3, which is to be bent, is supported two-dimensionally in the semicircular profile 30 during the bending process.

Figure 6:
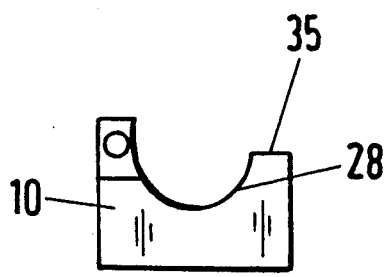
FIG. 6 shows a schematic representation of a lower clamping jaw in a side view.
Figure 8:
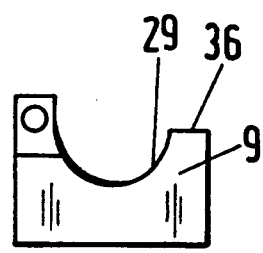
FIG. 8 shows a schematic representation of an upper clamping jaw in a side view.
Figure 7:
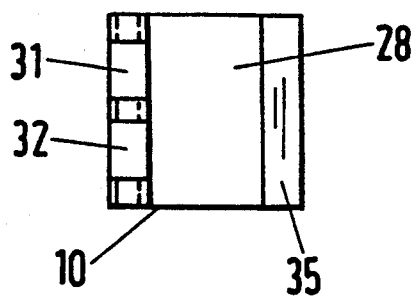
FIG. 7 shows the clamping jaw of FIG. 6 in a plan view.
Figure 9:
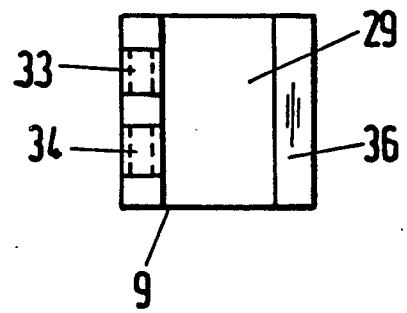
FIG. 9 shows the clamping jaw of FIG. 8 in a plan view.

In FIGS. 6 and 7, the lower clamping jaw 10 is shown in detailed representation. The shaped recesses 31, 32 and the corresponding counter shapes 33, 34 of the upper clamping jaw 9 (FIGS. 8 and 9), which form the hinge 12, can alternately be interchanged. In the region of the two interfaces 35, 36, the height of the clamping jaws 9, 10 is such that there is always a clamping gap (37) (FIG. 5).

In a further development, the parts 5, 6, 7, 8 of the apparatus can be made from a light metal or also from plastic and a bending spring can be inserted into the pipe 3 during the bending process.

What I claim is:

1. Manually operated, hand-held apparatus for bending a pipe having a pipe diameter up to 180° and made of a material selected from the group consisting of plastic and composites, said apparatus comprising:

a mounting plate;

pins extending from said mounting plate;

chuck means for holding a pipe to be bent, said chuck means being mounted on said mounting plate, said chuck means including:

hinged clamping jaws pivotal between an open and a closed position, one said clamping jaw being stationarily mounted on said mounting plate and the other said clamping jaw being pivotably mounted on said one clamping jaw for pivotal movement between said open and closed positions, each of said clamping jaws having a cross-sectional configuration conforming partially to the cross-sectional configuration of the pipe being bent;

a clamping dog on one of said clamping jaws; and a clamp for clamping said clamping jaws in said closed position, said clamp being pivotally mounted on the other of said clamping jaws on which said clamping dog is not mounted between a clamping position and a non-clamping position, said clamp including a clamping arm having an arcuate surface which is engageable with said clamping dog when in said clamping position and which provides an increasing clamping force as said clamping position is approached;

a bending template mounted on said mounting plate and having a partial circular bending surface on which the pipe is bent, said partial circular bending surface having a center and a radius equal to 1.25 to 3.5 times the pipe diameter;

pivotal lever means for engaging and bending the pipe on said bending template during pivotal movement of said pivotal lever means, said pivotal lever means being mounted on said mounting plate for pivotal movement about a pivotal axis which is coincident with said center of said bending surface, and said pivotal lever means including a bending roller operable to engage and bend the pipe on said bending template during pivotal movement of said pivotal lever means, said pivotal lever means having a fork construction in which two spaced legs are joined to an end section, each of said legs having a slot receiving said pins to thereby pivotably mount said pivotal lever means on said pins; and a hand lever mounted on said mounting plate, said hand lever and said pivotal lever means being arranged so as to be manually grasped to effect pivoting of said pivotal lever means relative to said bending template to thereby effect bending of said pipe.

2. Manually operated apparatus for bending pipes according to claim 1, wherein said bending surface of said bending template has a cross-sectional configuration conforming partially to the cross-sectional configuration of the pipe which is bent, and said bending roller having a partial cross-sectional configuration conforming partially to the cross-sectional configuration of the pipe which is bent.

3. Manually operated apparatus for bending pipes according to claim 1 further comprising indicia means on said bending template for providing an indication of the extent to which the pipe is being bent.

4. Manually operated apparatus for bending pipes according to claim 1, wherein each of said clamping jaws is changeable for handling different pipe sizes.

5. Manually operated apparatus for bending pipes according to claim 1, wherein said clamp further includes a clamping lever and said clamping arm projects from said clamping lever.

6. Manually operated apparatus for bending pipes according to claim 1, wherein said pivotal lever means has an end section and a fork construction in which two spaced legs of the fork construction are joined to said end section, and a lever extension detachably disposed on said end section for increasing the leverage of said pivotal lever means.

7. Manually operated apparatus for bending pipes according to claim 1 further comprising mounting means for mounting said hand lever on said mounting plate in variable positions such that the relative position between said hand lever and said mounting plate can be varied.

8. Manually operated apparatus for bending pipes according to claim 7 further comprising a hand lever extension detachably mounted on said hand lever for increasing the leverage of said hand lever.

9. Manually operated apparatus for bending pipes according to claim 1 further comprising mounting means for removeably mounting said bending template on said mounting plate such that variable size bending templates are mountable on said mounting plate.

10. Manually operated apparatus for bending pipes according to claim 1 further comprising mounting means for removeably mounting said pivotal arm means on said mounting plate such that variable size pivotal arm means are mountable on said mounting plate.

11. Manually operated apparatus for bending pipes according to claim 1, wherein said bending template has a semicircular configuration.

12. Manually operated apparatus for bending pipes according to claim 1, wherein said chuck means, said bending template, and said pivotal lever means are made of plastic.

13. Manually operated apparatus for bending pipes according to claim 1, wherein said mounting plate has a front section and a rear section, said pivotal lever means being pivotably mounted on said front section, said chuck means and said hand lever being mounted on said rear section, said chuck means generally overlying said hand lever.

* * * * *